Oct. 12, 1948.　　　P. W. GAENSSLE　　　2,451,329
CUSHIONED DISK BRAKE SHOE ASSEMBLY
Filed Oct. 3, 1946　　　　　　　　　　　　　2 Sheets-Sheet 1
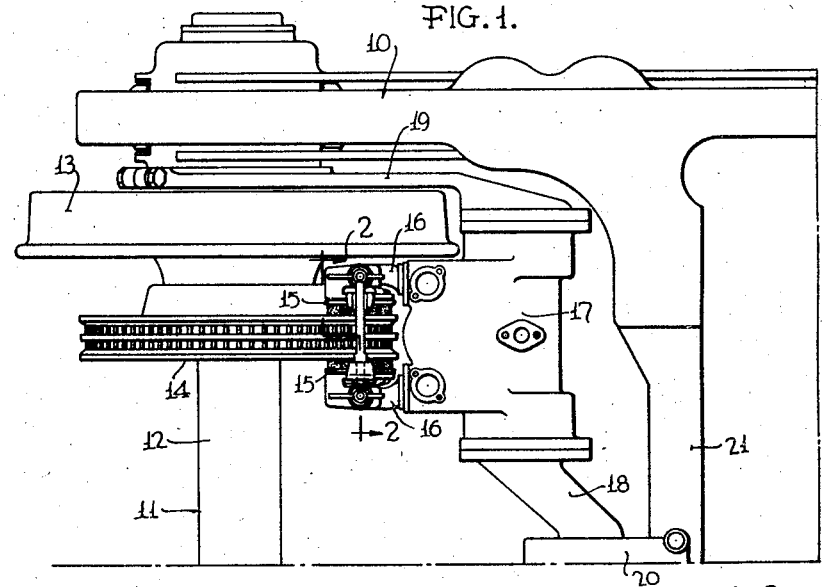
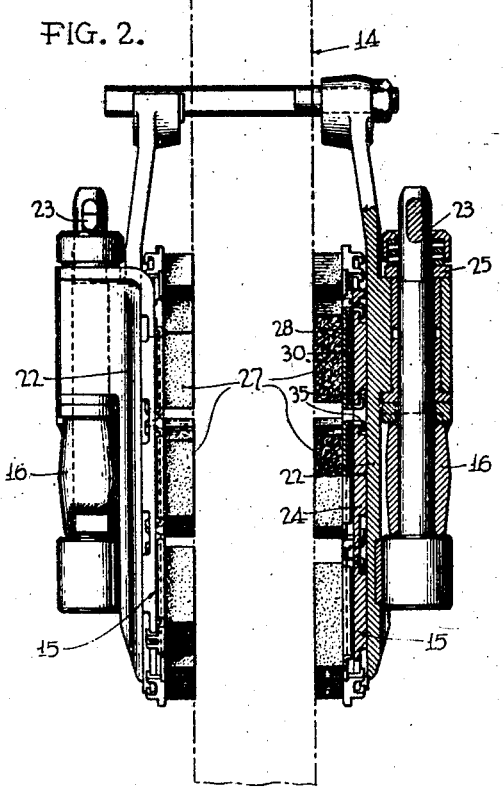
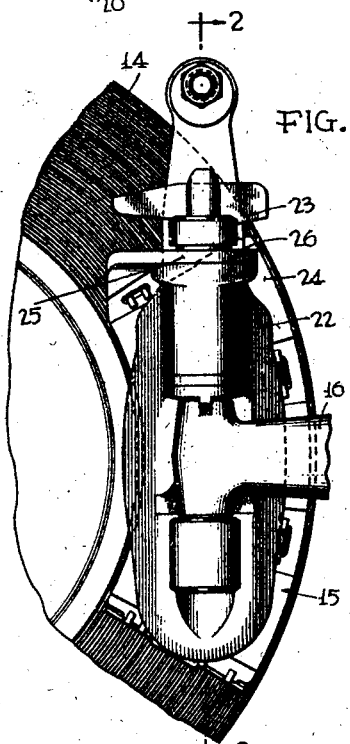
INVENTOR
Paul W. Gaenssle
BY
ATTORNEY Oct. 12, 1948.    P. W. GAENSSLE    2,451,329
CUSHIONED DISK BRAKE SHOE ASSEMBLY Filed Oct. 3, 1946    2 Sheets-Sheet 2

INVENTOR
Paul W. Gaenssle

BY
ATTORNEY

Patented Oct. 12, 1948

2,451,329

UNITED STATES PATENT OFFICE 2,451,329

CUSHIONED DISK BRAKE SHOE ASSEMBLY

Paul W. Gaenssle, Detroit, Mich., assignor to The Budd Company, Philadelphia, Pa., a corporation of Pennsylvania Application October 3, 1946, Serial No. 700,947

6 Claims. (Cl. 188—234)

The invention relates to brake shoes and more particularly to such shoes faced with a replaceable lining.

The invention is concerned particularly with brake shoes adapted for heavy duty braking, such as the braking of high speed railway vehicles. In such brakes the rate of heat development is very high, and this is particularly true if there are local high spots on the shoes which increase the heating effect at such spots and may result in heat checks on the brake rotor and greatly increase wear on the shoe. To carry away the heat developed during braking, various expedients have been proposed, such as centrifugal blower type brake rotors, having means for blowing cooling air radially past the braking elements of the rotor and spacing the brake lining blocks or pads on the shoe both radially and circumferentially to allow the air to flow between said spaces and carry off heat both from the shoe and the rotor engaged by the shoes. But all of these expedients sometimes fail to prevent heat checks, particularly such heat checks as are caused by high localized pressure on the shoe.

It is an object of the invention to overcome this difficulty and to provide a brake shoe which minimizes the chance of high localized pressure, which can be readily fabricated at low cost and one in which the lining can be readily renewed with a minimum of labor.

The object is attained by mounting the spaced brake lining pads or blocks so that they may have slight independent tilting movement in all directions on a backing member having a flat face and to provide such lining pads with means to permit their ready application to and removal from the backing member.

These and other and further objects and advantages and the manner in which they are attained will become fully apparent from the following detailed description when read in connection with the drawings forming a part of this specification.

In the drawings,

Figure 1 is a plan view of one-quarter of a railway truck to which a brake embodying the shoe of the invention has been shown applied;

Figure 2 is an edge elevational view on an enlarged scale of two spaced shoes and their mounting means, the shoes being shown in their operative relation to a brake rotor indicated in dot-and-dash lines, the right-hand shoe and its mounting being shown in vertical transverse section as indicated by the lines 2—2 of Fig. 1, Fig. 3 and Fig. 4;

Figure 3 is a side elevational view, on the same scale as Fig. 2, of the shoe and its mounting and adjacent parts of the brake rotor with which it coacts;

Figure 4:
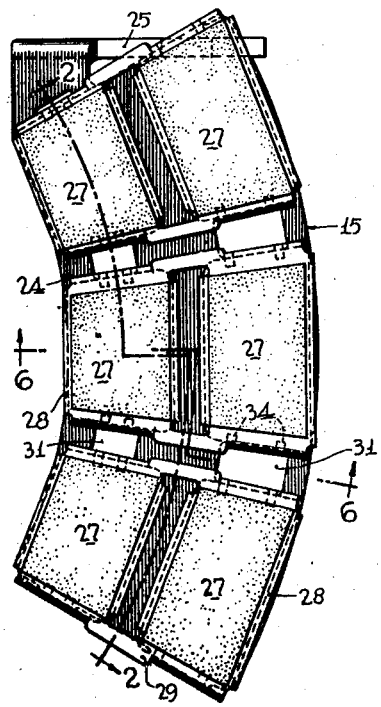
Figure 4 is a face view of the shoe per se, on a still further enlarged scale.
Figure 5:
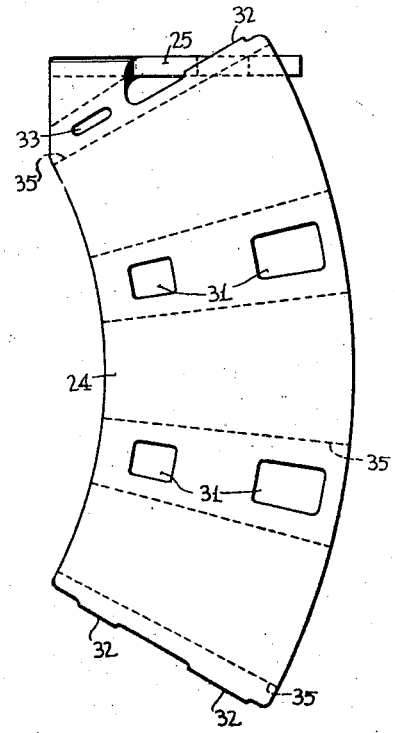
Figure 5 is a similar view of the backing plate of the shoe with the brake lining removed.

In the drawings, the invention has been shown applied to a railway truck brake of the disc type, but it will be understood that this is merely for purposes of illustration, since certain features thereof are equally applicable to other types of brakes.

Referring to Fig. 1, in which a brake and truck organization similar to that disclosed in copending application Serial No. 399,779, filed June 26, 1941, now Patent No. 2,413,614 issued December 31, 1946, is shown, the truck frame 10 is shown supported by a wheel and axle assembly, as 11, comprising an axle 12, wheels, as 13, and disc-like brake rotors, as 14, one rotating with each wheel of said assembly. The brake shoes 15, 15 and their actuating or brake levers 16, 16 and cylinder actuator 17 are carried by a transversely extending brake support 18 having its ends supported from the ends of the wheel and axle assembly 11 by longitudinally extending arms, as 19, and having an intermediate connection, as 20, to the truck frme transom 21, to take the braking torque, all as more fully shown, described and claimed in the above-identified application.

For convenience of assembly and disassembly of the shoes 15 they are readily demountably secured to a flat faced mounting member 22, which is mounted in turn on the adjacent end of the respective brake lever 16, as by a readily detachable connection, as shown and claimed in Patent No. 2,402,386, issued June 18, 1946. The same readily detachable connection designated generally by 23 may hold the shoe per se in place on the mounting 22 in a manner similar to that disclosed and claimed in copending application Serial No. 579,223, filed February 22, 1945.

To this end the shoe per se designated 15 and carrying the brake lining comprises an arcuate segmental flat plate backing having its main body portion 24 seated in contact with the flat face of the adjacent mounting member 22 and having an end portion 25 extending substantially at right angles to the main body portion 24 and seated against the enlarged flat end face 26 of the mounting member 22 and secured thereto by the readily detachable means 23. Suffice it to say here, that when the readily detachable means 23 is released, the shoe 15 can be readily vertically withdrawn from the space between the backing member and the adjacent radial face of the disc rotor 14.

On the flat face of the backing plate body portion 24 adjacent the rotary brake member 14, according to the invention, there are secured a plurality of spaced composition lining blocks or pads 27, these blocks being spaced radially and circumferentially as clearly appears in Fig. 4, to allow the cooling air to flow between them. Since these blocks are relatively unyielding, if they were secured directly to the backing member 23, they would tend to develop localized high pressure areas, when the shoes were forced against the rotor braking face, and this might result in local overheating of the rotor face and the development of heat cracks therein.

Figure 7:
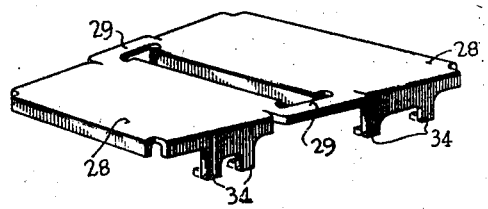
Figure 7 is a view of a sheet metal stamped lining holding per se.

To avoid this unequal pressure, and to permit ready attachment of the blocks to the backing member portion 24 and their similarly easy removal when the blocks are worn out, the individual blocks 27 are mounted on the bottom faces of shallow pan-like sheet metal stamped members 28 as by cementing them thereto. These members, on their sides opposite the blocks, form recesses in which are located rubber or rubber-like pads 30 holding the sheet metal members spaced from the rigid backing portion 24. Preferably, to simplify the manufacture and assembly, two such pan-like members 28 are formed from a single stamping, see Fig. 7, these two in the embodiment shown extending radially of the backing, and in this embodiment the entire lining comprises three such double units circumferentially spaced from each other, see Fig. 4. Each pair of radially arranged members 28 are connected by narrow flexible portions 29 adjacent their ends, see Fig. 7, these portions having sufficient flexibility to allow slight relative tilting of the so attached members with respect to each other and with respect to the backing member portion 24.

Figure 6:
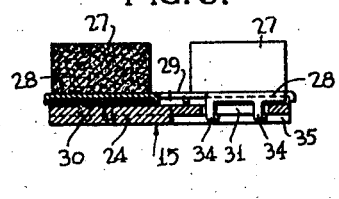
Figure 6 is a sectional view taken substantially along the line 6—6 of Fig. 4.

The members 28 together with their respective rubber-like pads 30 are rendered readily assembled with the backing member portion 24 by providing the backing member with suitably spaced and substantially rectangular openings 31, which openings at the ends of the backing portion 24 may be replaced by edge portions 32 and a narrow slot 33. The adjacent margins of the pan-like stamping 28 are provided in the adjacent margins with narrow tabs 34 which, when the lining mounting members 28 and their pads 30 are mounted in place on the backing plate 28, project through the respective openings 31 and slot 33 adjacent their sides and adjacent the edge portions 32 and, while the rubber pads are compressed by any suitable means, the lining carrying members 28 are secured in place with the rubber under compression, by bending over the tabs, as indicated in dotted lines in Figs. 4 and 7 and in full lines in Fig. 6, so that they lock behind the opposite face of the plate member portion 24. In this way the individual member 28 is secured in place to transmit the braking torque to the backing member portion 24, and at the same time hold the rubber-like pads 30 under some compression, while permitting slight individual tilting movement in all directions of the individual blocks, so as to insure equal pressure per unit area thereof.

Since there are no projections beyond the flat faces of the members 28 to which the lining blocks 27 are connected, the lining can be worn out almost completely before it needs replacing. Since it is desirable to keep the flat faced engagement between the backing member 23 and the mounting member 22, the local areas where the tabs engage the backing member are formed with shallow recesses 35, of a depth slightly greater than the thickness of the tabs so that the bent over tabs are entirely received in the respective recesses, see Fig. 2.

The rubber pads are preferably somewhat smaller in area, before compression, than the area of the respective recesses receiving them, so as to allow space for the necessary expansion due to the incompressibility of the rubber under the compression forces.

While a specific embodiment of the invention has been herein described in detail, it will be understood that changes and modifications may be made by those skilled in the art without departing from the main features of the invention, and such changes and modifications are intended to be covered by the appended claims.

What is claimed is:

1. A brake shoe of arcuate form adapted to coact with a radial braking rotor, said shoe comprising a flat faced backing member, a plurality of spaced brake units secured to said backing member, said units each comprising at least one shallow sheet metal pan having a composition lining block connected to the outside of the pan, a rubber-like cushioning pad confined by the sides of the pan and compressed between the pan and the backing member and means for so compressing the pad and for securing the pan to the backing member so as to take the braking torque.

2. A brake shoe of arcuate form adapted to coact with a radial braking rotor, said shoe comprising a flat faced backing member, a plurality of spaced brake units secured to said backing member, said units comprising at least a pair of shallow sheet metal pans connected together by spaced integral straps, each pan having a composition lining block cemented to the outside face of the bottom thereof, a rubber-like cushioning pad in each pan confined by the sides thereof and compressed between the pan and the backing member and means for so compressing the pads and for securing said units to the backing.

3. A brake shoe of arcuate form adapted to coact with a brake rotor, said shoe comprising a flat faced backing member, one side of which is arranged for engagement by a thrust transmitting head, and the other side of which is adapted to mount a brake lining, said lining comprising a sheet metal element having a composition brake lining block connected to one side thereof and having a recessed portion on the other side thereof facing said backing member, a rubber-like cushioning pad disposed in said recessed portion, and means securing the sheet metal element to the backing member to compress the rubber-like pad and transmit the braking torque from said element to the backing member.

4. A brake shoe of arcuate form adapted to coact with a brake rotor, said shoe comprising a flat faced backing member, one side of which is arranged for engagement by a thrust transmitting head, and the other side of which is adapted to receive a brake lining, said lining comprising a sheet metal element having a composition brake block secured to one side thereof, and a recess on the other side thereof opposite said block and of approximately the extent thereof, a rubber-like cushioning pad disposed in said recess, and means securing the sheet metal element to the backing member to compress said rubber-like pad and transmit braking torque from said element to the backing member, said securing means comprising tabs on said element extending through openings in or adjacent edge portions of the backing member and bent over against the side thereof arranged for engagement with said head.

5. A brake shoe of arcuate form adapted to coact with a brake rotor, said shoe comprising a flat faced backing member, one side of which is arranged for flat-wise engagement with a thrust transmitting head and the other side of which is adapted to receive a brake lining, said lining comprising a sheet metal element having a composition brake block secured to one side thereof and a recess formed in the side thereof opposite said block and of approximately the extent thereof, a rubber-like cushioning pad disposed in said recess, and means securing said sheet metal element to the backing plate to compress said pad and transmit braking torque from said element to said backing member, said securing means being disposed wholly between the face of said element carrying said block and the face of said backing member arranged for engagement with said head.

6. A brake shoe of arcuate form adapted to coact with a brake rotor, said shoe comprising a flat faced backing member, one side of which is arranged for engagement with a thrust transmitting head and the other side of which is adapted to receive a brake lining, said lining comprising a sheet metal element having a plurality of spaced composition brake blocks secured to one side thereof and recesses formed in the opposite side thereof and each of approximately the extent of the respective blocks, a rubber-like cushioning pad disposed in each recess, and means securing said sheet metal element to the backing member so as to compress said rubber-like pads and transmit the braking torque from said element to said backing member, said connection and the flexibility of said sheet metal element and the rubber-like pads permitting each of said blocks to tilt slightly independently of the others in all directions.

PAUL W. GAENSSLE.

REFERENCES CITED

The following references are of record in the file of this patent:

UNITED STATES PATENTS

| Number | Name | Date |
|---|---|---|
| 1,620,030 | Krieg | Mar. 8, 1927 |
| 2,214,762 | Eksergian | Sept. 17, 1940 |
| 2,228,818 | Eksergian | Jan. 14, 1941 |